H. ROSENTHAL.
PRESSURE REGULATOR.
APPLICATION FILED APR. 4, 1919.
1,332,069.
Patented Feb. 24, 1920.
3 SHEETS—SHEET 1.
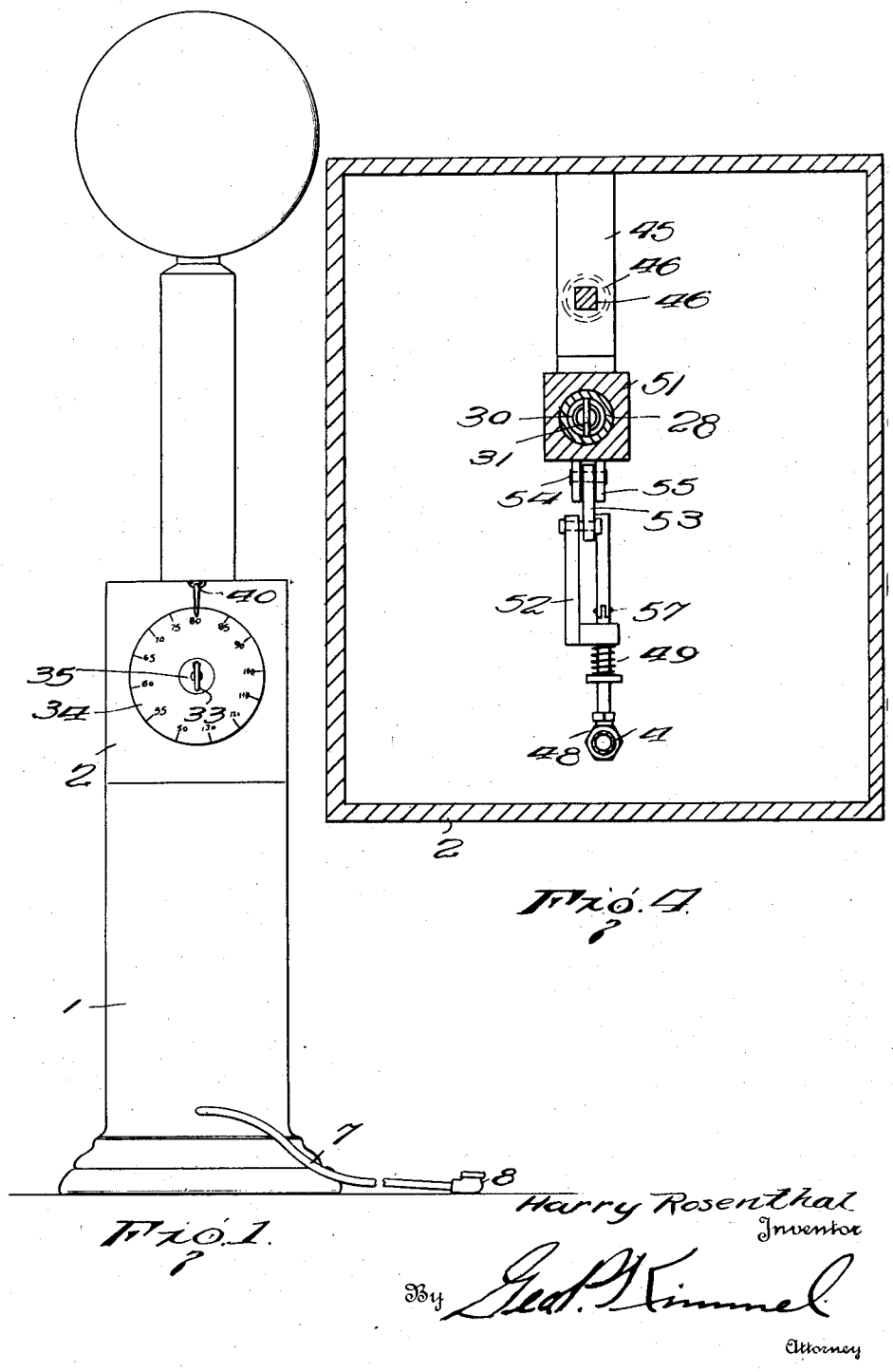
Harry Rosenthal
Inventor
By Geo. P. Kimmel
Attorney

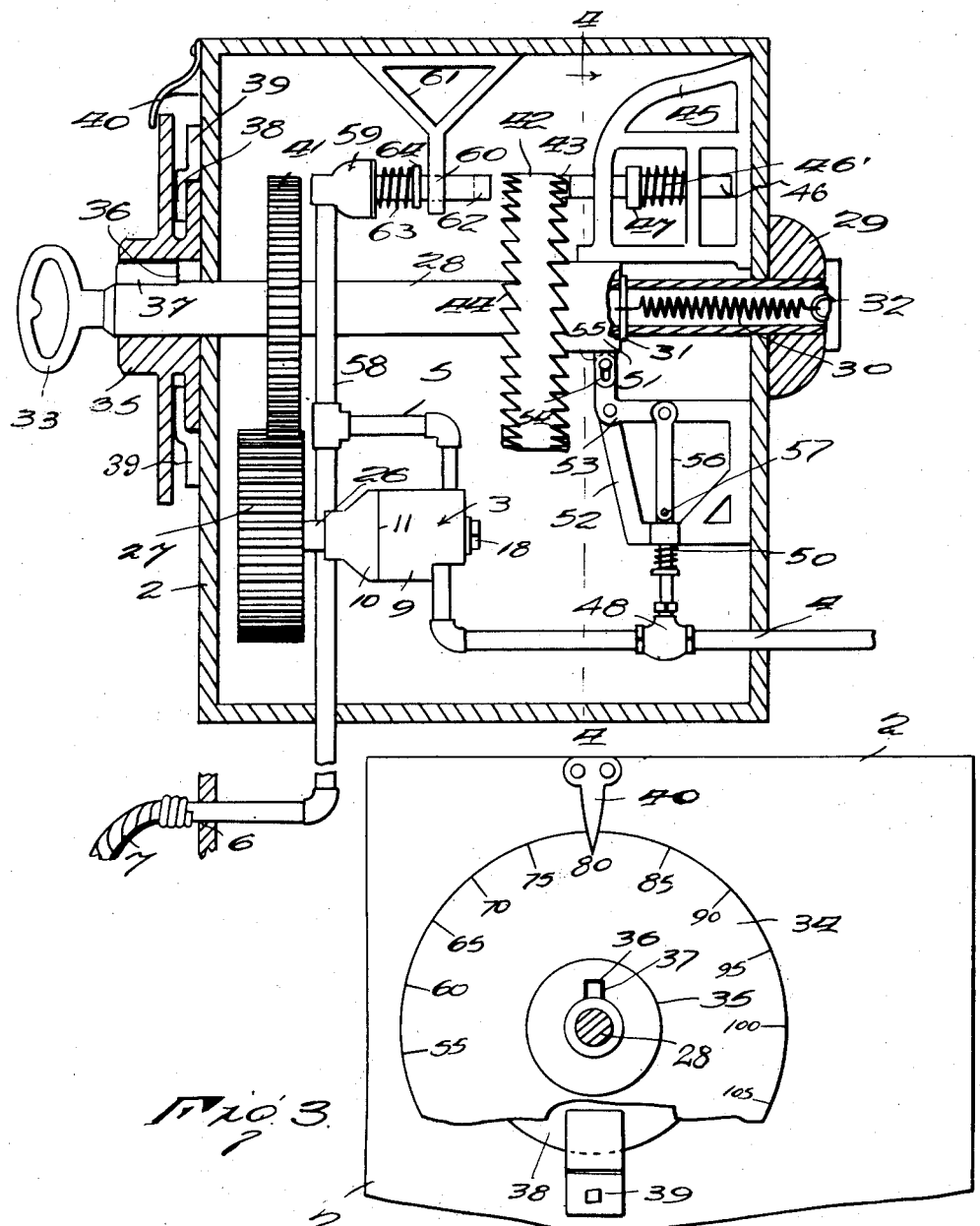

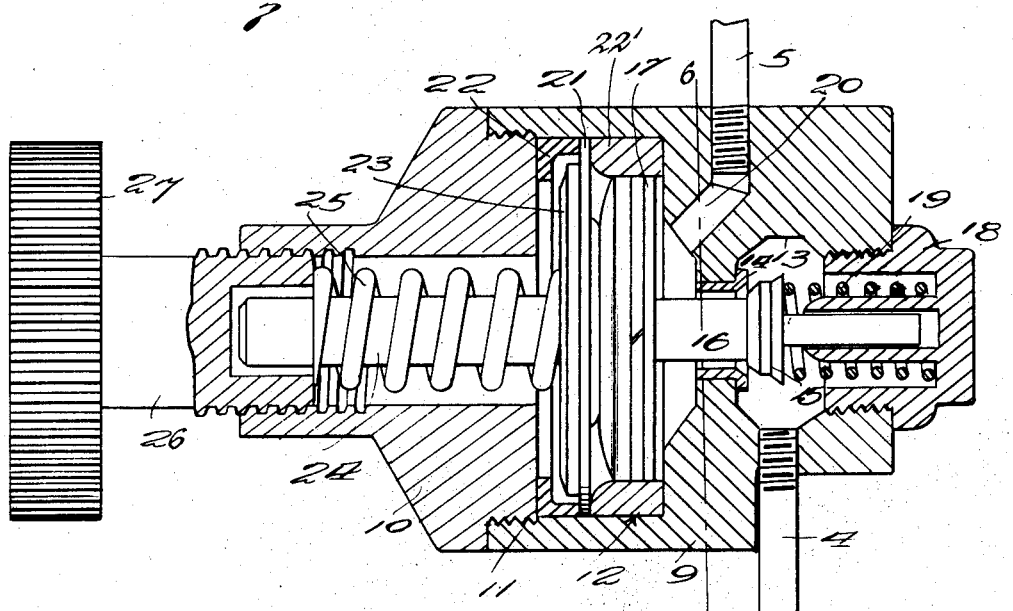
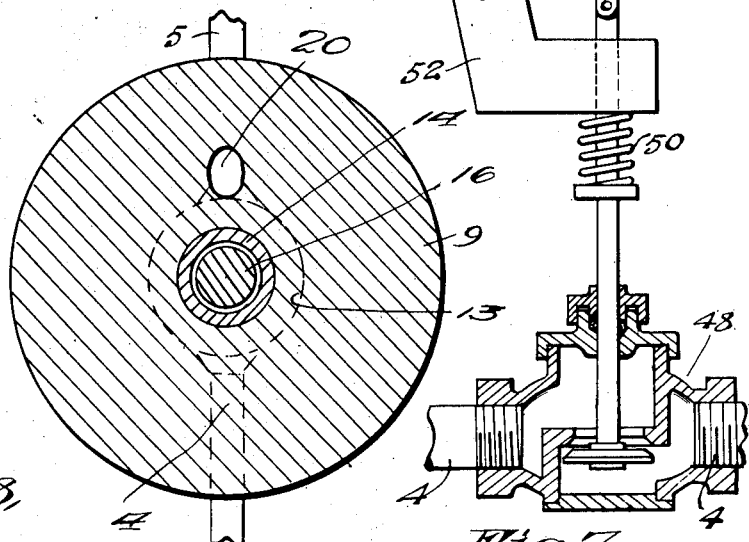
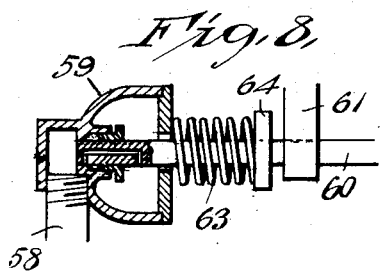

UNITED STATES PATENT OFFICE.

HARRY ROSENTHAL, OF REGINA, SASKATCHEWAN, CANADA.

PRESSURE-REGULATOR.

1,332,069.        Specification of Letters Patent.    Patented Feb. 24, 1920.

Application filed April 4, 1919. Serial No. 287,655.

*To all whom it may concern:*

Be it known that I, HARRY ROSENTHAL, a citizen of the United States, residing at Regina, in the Province of Saskatchewan, Canada, have invented certain new and useful Improvements in Pressure-Regulators, of which the following is a specification.

The present invention has reference generally to improvements in that class of inventions known as pressure regulators and more particularly relates to a device for inflating automobile tires or other articles to the desired pressure.

By actual test it has been found that the pressure in an air conducting hose, now commonly used in tire inflation devices, is approximately eighty pounds, and it is therefore the primary aim and object of this invention to provide a device of the above mentioned character wherein there is employed a pressure regulating valve while acting in conjunction therewith is coöperative indicating and operating means for the valve, normally set at eighty pounds, and desirably having a range from fifty to one hundred and ten pounds, in consequence permitting of an accurate inflation of the tire, from fifty to one hundred and ten pounds for instance, without the aid of a gage or other independent indicating device now necessary in the present type of inflation devices.

As an additional and equally important object this invention contemplates the provision of a device of the above mentioned character wherein there is employed automatic pressure reducing mechanism for acting in conjunction with the pressure regulating valve and the coöperating indicating and operating means to permit an accurate inflation of a tire, requiring less than eighty pounds, the reducing mechanism being so designed that a minimum amount of air only will be wasted during the inflation of such tire.

More particularly this invention embraces the provision of a device of the above mentioned character wherein the air line in addition to being fitted with the regulating valve has interposed therein a pressure reducing or check valve and a safety or bleed valve, the indicating and operating means being associated with these valves to insure an accurate inflation of a tire regardless of the pressure required or the pressure in the hose or pipe, which conducts the air from the regulator to the tire, at the time the valve at the end of said hose is connected to the tire valve.

It is a more specific object of this invention to provide a device of the above mentioned character wherein improved means is employed for mounting the operating and dial carrying shaft; to provide coöperative catch means on the shaft and in the casing designed to permit rotation or counter clockwise movement of the shaft for increasing the pressure yet preventing a clockwise movement of this shaft to decrease the pressure; to also provide coöperative means on the shaft and on the bleed valve for insuring the operation of the valve during a clockwise rotation of the shaft at the time it is desired to reduce the pressure; and to also provide an operable connection between the shaft and the check valve to insure the closing of the check or reducing valve when the shaft is moved preparatory to being rotated in a clockwise direction.

Among the other aims and objects of this invention may be recited the provision of a device of the above mentioned character wherein the number of parts are comparatively few, the construction simple, the cost of production low and the efficiency high.

The improvements in the details and arrangement of parts will be apparent from an inspection of the accompanying drawings, in connection with the specific description hereinafter contained, and wherein the preferred embodiment of the invention is disclosed for the purpose of imparting a full understanding of the invention.

The invention is clearly illustrated in the accompanying drawings, in which:—

Figure 1 is a front elevation of the invention,

Fig. 2 is an enlarged vertical longitudinal section through the casing, some of the parts being shown in side elevation, Fig. 3 is an enlarged front elevation including the dial, the projecting end of the shaft being shown in section, Fig. 4 is a section on line 4—4 of Fig. 2, Fig. 5 is an enlarged vertical longitudinal section of the regulating valve, and Fig. 6 is a transverse section on the line 6—6 of Fig. 5, Fig. 7 is a vertical longitudinal section of the check valve 48, Fig. 8 is a vertical longitudinal section of the bleeder valve 59.

Similar characters of reference are employed in all of the above described views, to indicate corresponding parts.

Referring now, more particularly, to the accompanying drawings there is provided a support in the form of a stand 1 for a casing or housing 2 of a rectangular configuration, while arranged within the casing is the improved regulating valve designated generally by the numeral 3. An inlet pipe 4 is led from an air pressure tank (not shown) being arranged through the stand and in communication with the valve casing 3. An outlet pipe 5 is led from the top of the valve casing 3 and has its outer portion projected through the stand near the lower end thereof as indicated at 6 and this projecting end is fitted with a flexible discharge tube 7 the outer end of which in turn carries a valve 8 which is adapted to be associated with a valve (not shown) on the inner tube of a tire or on any other object.

The regulator valve 3 in the present instance consists of a casing composed of longitudinally bored sections 9 and 10 detachably engaged with each other as at 11, the section 9 at its meeting end being recessed about the bore therethrough to provide a chamber indicated at 12. The section 9 has its bore enlarged to provide a chamber 13 for the valve while a seat member 14 is mounted in the bore between the two chambers and has coacting therewith the valve head 15, the stem 16 of which has bearing thereagainst a piston head 17 which is mounted in the chamber 12. A combined threaded cap and guide 18 is removably mounted at the outer portion of the bore of the section 9 while arranged in and having one end bearing thereagainst is a valve spring 19 the opposite end of which bears against the head 15.

In this connection it is to be noted that the inlet pipe 4 communicates with the chamber 13 while the outlet pipe 5 is arranged in communication with a passage way 20 which leads from the chamber 12. Coacting with the piston head 17 is a diaphragm 21 which is clamped between clamping rings 22 and 22' in the chamber 12, said rings being held in place by the section 10. A supporting disk 23 is arranged against the opposite face of the diaphragm and having a stem 24 extending through the bore of the section 10. A tension spring 25 is arranged about the stem 24, one end bearing against the disk 23 while the opposite end bears against the inner end of a screw 26 adjustably mounted in the outer threaded portion of the bore of the section 10. In this connection it is to be particularly understood that the threads of the threaded portion of the bore in the section 10 and the threads of the screw 26 are of such a pitch that one turn of the plug against tension of spring 25 will make a difference of about forty pounds in the resulting pressure. A gear 27 carried by the outer end of the screw 26 serves to facilitate the turning of the stem in a manner that will hereinafter appear and in the present instance preferably is provided with twenty-four teeth.

With a view toward providing the improved means for indicating the amount of pressure and for operating the regulating valve, a tubular shaft 28 is journaled in opposed bearing openings in the front and rear walls of the casing 2 being also accommodated in a bearing 29 on the rear end or wall of the casing 2. For normally holding the shaft 28 in its innermost position, a coil spring 30 is employed with one end connected to the shaft as by a transverse pin 31 while the opposite end is connected to a stop in the form of a disk 32 positioned at the outer end of the bearing 29, the opposite portion of the shaft being projected through the front wall and provided with a turn handle 33. A dial 34 is employed and has its hub portion 35 arranged about the forward projecting end of the shaft 28 and provided with a key way 36 which coacts with a key 37 on the forward projecting end of the shaft 28 to insure the rotation of the dial with the shaft, and in addition this key way and key coact to permit the independent sliding movement of the shaft relative to the dial. The dial is provided with a peripheral groove 38 in which are arranged the outer portions of angle plates 39, the inner portions of which are in turn fastened to the front face of the front wall of the casing and retain the dial member against sliding movement but permitting rotary movement thereof. A pointer 40 is secured to the front wall of the casing and coacts with the indicia on the dial which has preferably a range of from fifty to one hundred and ten pounds, and in view of the fact that from actual test it has been found that there is normally a pressure of approximately eighty pounds in the air conducting pipe, the dial is set so that the pointer will coact with the eighty pound mark. A gear 41 is carried by the shaft 28 within the casing and meshes with the gear 27, being preferably provided with thirty-six teeth so as to provide for the range of sixty pounds pressure. At this point, attention is particularly directed to the fact that the gear wheel 41 is of less thickness, in fact only about half as thick as the gear 27, so that these gears will remain in mesh regardless of the sliding movement of the shaft 28 for a purpose that will hereinafter become apparent. By the present construction described however, it will be observed that if more than eighty pounds pressure is desired it is only necessary to turn the key or handle 33 counter-clockwise and move the dial correspondingly, and this turning movement owing to the meshing gears 41 and 27, serves as a proper adjustment of the screw 26 in the valve head thus regulating the passage of air through the pipes 4—5 and 7 to the valve 8, as is apparent.

With a view toward providing an automatic pressure reducing mechanism, a wheel 42 is carried by the shaft 28 and is provided on its opposite faces with oppositely disposed ratchet teeth 43 and 44. A bracket 45 is carried by the rear wall of the casing and has slidably mounted therein a pawl 46 normally held forwardly by the spring 46' which is disposed thereabout and has its respective ends journaled against a portion of the bracket 45 and a collar 47, the pawl or dog being designed to allow counter-clockwise rotation of the shaft 28, riding over the teeth or ratchet face 43 owing to yielding mounting thereof, but on the other hand prevents a clockwise rotation of the shaft, making it necessary to pull the shaft forwardly against the tension of the spring 30 if it is desired to reduce the pressure or secure less than an eighty pound pressure. A pressure reducing or check valve 48 of a conventional construction is interposed in the inlet pipe 4, the vertically movable stem 49 of the valve having disposed thereabout a coiled spring 50 which is tensioned to hold the valve unseated, normally. In order that the pressure may be reduced as it passes through the pipe 4, a collar 51 is loosely mounted on the shaft 28 between the pin 31 and the rear face of the wheel 42 so as to be held against longitudinal sliding movement, while the outer surface is square in contour, the upper surface being arranged in intimate contact with the base portion of the bracket 45 so as to be held against rotation. Another bracket 52 extends laterally from the rear wall of the casing 2 and has pivotally connected thereto a bell crank lever 53 one end portion of which is operably connected as at 54 to a depending ear 55 on the collar 51, while the opposite portion is operatively connected with a link 56 the lower end of which is in turn operably connected as at 57 to the upper end of the stem of the check valve 48. By this arrangement it will be apparent that when the shaft 28 is pulled forwardly, the pin 31 will insure of the sliding of the collar 51 therewith which rocks the bell crank lever 53 and in consequence actuates the stem 49 of the reducing check valve. Joined to communicate with and leading upwardly from the outlet pipe section 5 in the casing 2 is a pipe section 58, the upper end of which is fitted with a bleed valve generally designated 59, the casing being carried by and arranged in communication with the pipe 58 while the stem 60 of the valve is slidably mounted in a bracket 61 which depends from the top of the casing 2. The outer end of this stem is designed to form a pawl or dog 62, while the valve is normally held closed and the stem normally arranged in an extended position by a coiled expansion spring 63 disposed about the stem, the spring bearing against the casing of the valve 59 and against the collar 64 on a stem, the collar being coupled in the usual manner to the shell 59 of the valve by rods, as shown. In this connection it is to be understood that the pawl 62 is designed to coact with the ratchet teeth 44 on the wheel 42, the pawl being so positioned as to ride over the teeth 44 subsequent to pulling the shaft 28 forwardly and during a clockwise rotation of the shaft, the teeth 44 acting as a means for operating the valve 59, so that in the event of the air in the discharge portion 7 of the pipe 5 rising to a pressure higher than desired, the excessive pressure will exhaust therethrough. In this connection it is to be particularly noted that the slower the shaft 28 is rotated in its clockwise direction for the alternate unseating of the bleeder valve 59, the better will be the exhaust of the excessive pressure, while owing to the closing of the check valve 48 from the forward sliding movement of the shaft, air will not be wasted from the main supply, as is apparent. It is of course apparent that subsequent to the clockwise rotation of the shaft for the adjustment of the valve 3 to cause a reduced pressure, the handle 33 is released so that the spring 30 will draw the shaft to its innermost position opening the check valve 48 and causing an engagement of the teeth 43 by the dog or pawl 46.

The operation of the invention is as follows:

Assuming that the parts have been assembled in the manner described and as illustrated in the drawings, that for instance if the gage or dial was previously set at one hundred pounds pressure and it is now desired to obtain only a fifty pound pressure, the handle 33 is engaged to pull the shaft 28 forwardly against the tension of the spring 30, the key 37 sliding in the key way 36 and the wheel 42 moving away from the pawl 46. During this movement, owing to the arrangement of the collar 51 between the pin 31 and the wheel 42, the pin will also move the collar forwardly rocking the bell crank lever 53 and in consequence closing the check valve 48. When pulled forwardly the ratchet teeth 44 of the wheel 42 engage the pawl 62. The clockwise rotation of the shaft 28 is permitted owing to the relation between the teeth 44 and the pawl 62, the latter riding over the teeth and alternately opening and closing the bleed valve 59 so that the excessive pressure will escape from the pipe 5 and tube 7. This clockwise rotation of the shaft causes a rotation of the screw 26 because of the intermeshing gears 41 and 27 carried respectively by these parts, and in consequence adjust the tension of the spring 25 of the regulating valve to vary the position of the valve head 15, thus positioning this head so that the desired pressure will pass to the pipe 5. When the parts have been arranged in a properly adjusted position, the handle 33 is released, the spring 30 acting to return the shaft 28 to its innermost position and opening the check valve 48 through the reverse action of the sleeve 51 and bell crank lever 53, so that pressure will pass from the pipe 4 regulated through the valve 3 thence through the pipe 5 and tube 7.

It is believed in view of the foregoing description that a further detailed description of the operation of the invention is entirely unnecessary. Likewise, it is believed that the advantages of the invention will be readily apparent.

As many changes could be made in the above construction and many apparently widely different embodiments of this invention could be made without departing from the scope thereof, and it is intended that all matter contained in the above description and shown in the accompanying drawings shall be interpreted as illustrative and not in a limiting sense. It is also to be understood that the language used in the following claims is intended to cover all of the generic and specific features of the invention herein described and all statements of the scope of the invention, which, as a matter of language, might be said to fall therebetween.

Having thus fully described the invention, what is claimed as new and desired to be secured by Letters Patent, is:—

1. A pressure regulator including a shaft mounted for slidable and rotatable movement, an air pipe line, a pressure regulating valve in the pipe line, a check valve in the pipe line, means whereby the rotation of the shaft controls the pressure regulating valve, and means whereby the slidable movement of the shaft controls the action of the check valve.

2. A pressure regulator including a casing, an air pipe line through the casing, a pressure regulating valve in the pipe line, a shaft slidably and rotatably mounted in the casing and operably connected with the valve, coöperative means on the shaft and on the casing for permitting of a counter-clockwise rotation only of the shaft when it is desired to increase the pressure, and reducing mechanism in the casing and associated with the pipe line for shutting off the pressure and for exhausting the air in the discharge portion of the pipe line and operable upon the sliding and clockwise movement of the shaft consequently setting the reducing valve at a reduced pressure.

3. A pressure regulator of the character described including a casing, an air pipe line therethrough, a pressure regulating valve interposed in the pipe line, a check valve in the pipe line, a bleed valve communicating with the discharge portion of the pipe line, a rotatably slidably mounted shaft in the casing and operably connected with the regulating valve for increasing the pressure when the shaft is rotated counter-clockwise, coacting indicating means on the shaft and on the casing, coöperative means in the casing and on the shaft for preventing counter-clockwise rotation of the shaft, coöperative means on the shaft and on the bleeder and check valves for operating the said valves when the shaft is slid and rotated clockwise so as to exhaust the pressure in the discharge portion of the pipe line while the regulating valve is being set at a reduced pressure.

4. A pressure regulator including a casing, an air pipe line arranged through the casing, a pressure regulating valve interposed in the pipe line and mounted in the casing and provided with an adjusting screw, a slidable and rotatable shaft in the casing and operably connected with the adjusting screw, coöperative indicating means on the shaft and on the casing, safety pressure reducing mechanism in the casing and associated with the air line and shaft and operable by the sliding and counter-clockwise movement of the shaft for exhausting pressure in the discharge portion of the pipe at the time the regulating valve is adjusted to reduce the pressure.

5. A pressure regulator including a casing, an air pipe fastened through the casing, a regulating valve interposed in the pipe line and having an adjusting screw, a gear on the screw, a check valve mounted in the inlet portion of the pipe line, a bleed valve associated with the discharge portion of the pipe line and having a yieldingly mounted stem forming a pawl, a slidably and rotatably mounted shaft in the casing, coöperative indicating means on the shaft and the casing, a gear on the shaft meshing with the gear on the screw, a wheel on the shaft having oppositely disposed ratchet teeth on its side faces, a spring pressed pawl in the casing for coacting with one of the ratchet faces for allowing a counter-clockwise movement but preventing a clockwise movement of the shaft, a collar loosely connected to the shaft but movable with the shaft when the latter is moved longitudinally, an operable connection between the collar and the check valve for closing the valve when the shaft is moved longitudinally, the other ratchet face of the wheel being engageable with the pawl on the stem of the bleed-valve for insuring the operation of the bleed valve during a clockwise rotation of the shaft subsequent to the sliding of the shaft for exhausting the air in the discharge portion of the pipe when the indicating means is being set at a reduced pressure.

6. A pressure regulator including a casing, an air pipe line therethrough, a regulating valve interposed in the pipe line, a check valve mounted in the inlet portion of the pipe line, a bleed valve mounted in the discharge portion of the pipe line, a main shaft slidably and rotatably mounted in the casing, coöperative means on the shaft and on the casing for indicating pressure, means for operably connecting the shaft with the regulating valve, means for preventing counter-clockwise movement of the shaft, an operable connection between the shaft and the check valve for closing the check valve when the shaft is moved forwardly, means on the shaft for actuating the bleed valve when the shaft is in its outermost position and is rotated clockwise to exhaust the air in the discharge portion of the air pipe line, and means for returning the shaft to its innermost position and thereby returning the check valve to open position.

7. A pressure regulator including a shaft mounted for slidable and rotative movement, an air pipe line, a pressure regulating valve in the pipe line, a check valve in the pipe line, a bleed valve associated with the pipe line, means whereby the rotation of the shaft controls the pressure regulating valve, means whereby the slidable movement of the shaft in one direction controls the action of the check valve, and means whereby the movement of the shaft in the other direction controls the action of the bleed valve.

In testimony whereof, I affix my signature hereto.

HARRY ROSENTHAL.